Aug. 25, 1964  A. L. PINEGAR  3,145,709
MOBILE TRACTION UNIT
Filed Dec. 6, 1962  2 Sheets-Sheet 1
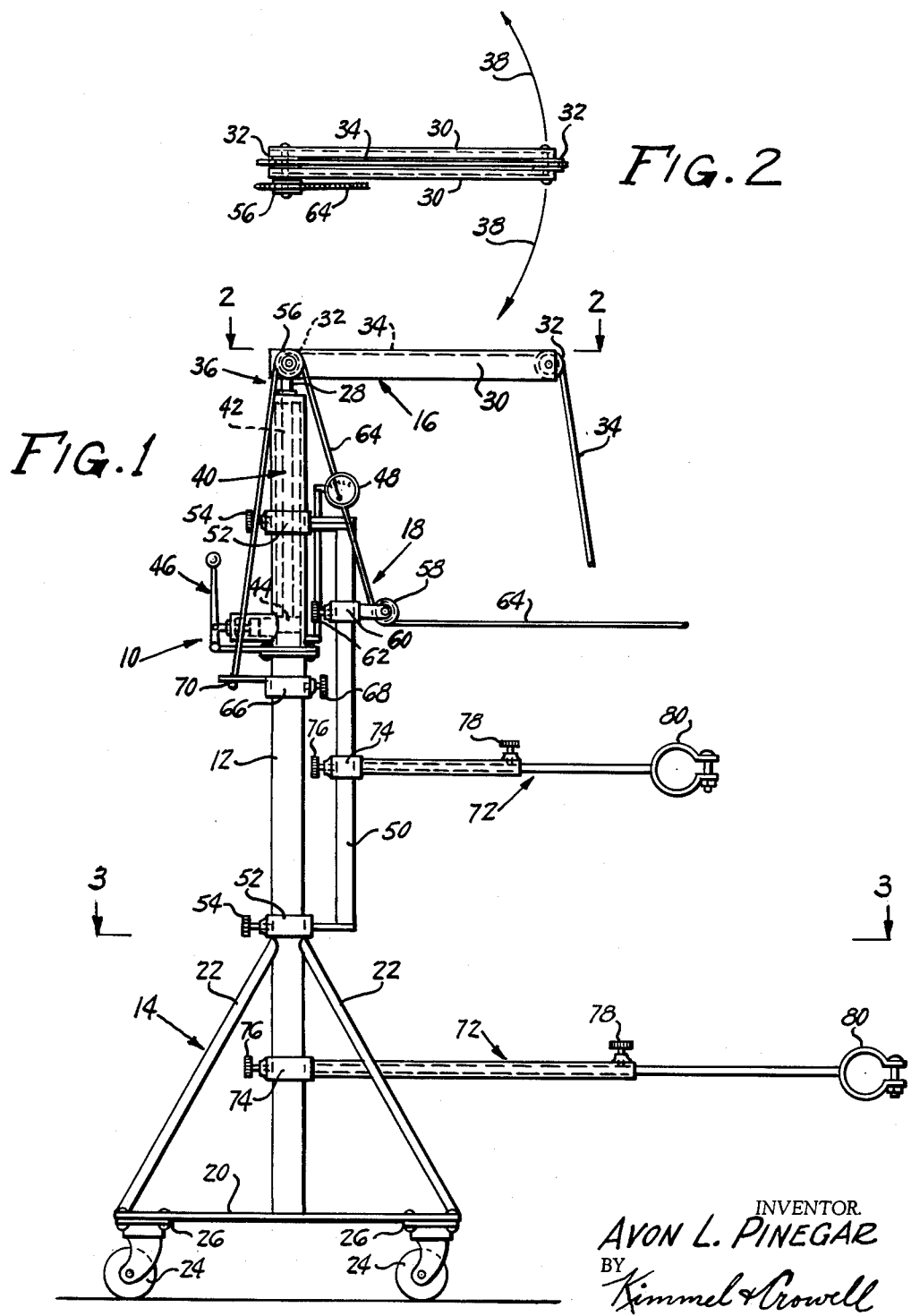
INVENTOR.
AVON L. PINEGAR
BY Kimmel & Crowell
ATTORNEYS.

Aug. 25, 1964      A. L. PINEGAR      3,145,709

MOBILE TRACTION UNIT

Filed Dec. 6, 1962      2 Sheets-Sheet 2

INVENTOR.
AVON L. PINEGAR
BY
Kimmel & Crowell
ATTORNEYS.

[column 1]

3,145,709
MOBILE TRACTION UNIT
Avon L. Pinegar, P.O. Box 442, Hot Springs, Mont.
Filed Dec. 6, 1962, Ser. No. 242,715
4 Claims. (Cl. 128—84)

This invention relates to a mobile traction unit and more particularly to a device for providing accurate and readily variable traction in either a horizontal or a vertical plane.

The primary object of the instant invention is the provision of a traction unit which is mobile and can be readily positioned wherever it is necessary to place a patient in traction.

A further object of this invention is to provide a device of the character described wherein the amount of the traction can be accurately determined and easily controlled.

Another object of the instant invention is the provision of a portable traction unit which would avoid the necessity of undue handling of a patient.

A still further object of this invention is to provide a mobile source of traction that can be used on the extremities of patients during corrective manipulation or application of an immobilizing splint or cast with the extremity in the final desired position.

Another object of the instant invention is the provision of a traction unit having hydraulically controlled means to vary the amount of traction applied and a pressure gauge to indicate the magnitude of the traction.

An additional object of this invention is the provision of a device of the character described wherein vertical traction or horizontal traction may be applied to the patient from any desired direction.

A still further object of the instant invention is to provide a portable traction unit having a collapsible chair means removably fixed thereto.

Another object of this invention is to provide a mobile traction unit having means to clampingly secure the same to a fixed support such as a hospital bed, operating table, or the like.

Other and further objects reside in the combinations of elements, arrangements of parts, and details of construction.

Still other objects will in part be obvious and in part be pointed out as the description of the invention proceeds and as shown in the accompanying drawings.

In the drawings:

FIGURE 1 is a front elevational view of a mobile traction unit in accordance with the instant invention;

FIGURE 2 is a top plan view of FIGURE 1 taken on line 2—2;

Similar reference characters refer to similar parts throughout the several views of the drawings.

Figure 3:
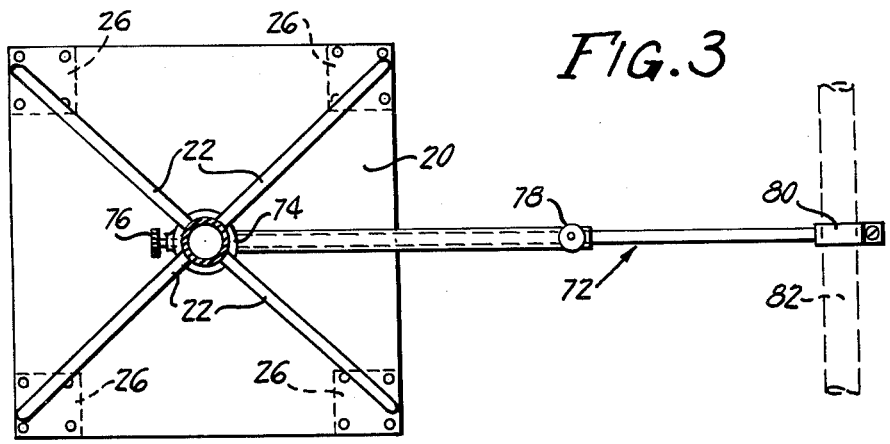
FIGURE 3 is a transverse cross-sectional view taken on line 3—3 of FIGURE 1 and indicating a fixed support in dotted lines.

Referring now to the drawings and more particularly to FIGURE 1, a mobile traction unit in accordance with the instant invention is indicated generally by the reference numeral 10 and is comprised basically of a vertically extending standard member 12 having a transporting means indicated generally at 14 movably supporting the same, a vertical traction means designated by the reference numeral 16, and a horizontal traction means indicated generally at 18, adjustably secured to the standard member 12.

The transporting means 14 includes a base member 20 having a plurality of inclined braces 22 fixedly securing the standard member 12 thereto, and a plurality of caster wheels 24 rotatably secured in spaced relation to each other on plate members 26 fixed to the undersurface of the base member 20. Suitable brake means (not shown) may be provided on each or any of the caster wheels 24 to provide stability to the unit 10 when it is not necessary to transport the same or when it is in use.

The vertical traction means 16 in the embodiment shown includes a vertical traction arm 28 comprised of a pair of spaced plates 30 rotatably supporting therebetween a pulley means 32 at each extremity.

It is to be understood that the vertical traction arm 28 can be a solid member having slots adjacent each extremity wherein the pulley means 32 are rotatably mounted and a groove defined in the upper surface for passage of the vertical traction cable 34.

The vertical traction arm 28 is pivotally secured to the upper end of the piston rod 42 as indicated generally at 36 for rotation thereabout in a horizontal plane as shown by the arcuate arrow members 38 in FIGURE 2.

The amount of traction provided may be readily varied by incorporating a hydraulic cylinder indicated generally at 40 in FIGURE 1 into the upper portion of the standard member 12. A piston rod 42 is extensibly and retractably supported therein and has its upper end secured to the vertical traction arm 28. Additional means, such as roller bearings (not shown) may be provided to assist in the pivotal mounting for the vertical traction arm 28. The piston rod 42 carries a piston 44 at its lower end slidably secured in the upper portion of the standard member 12. A hand operated hydraulic pump shown generally at 46 provides the motive power for extending the piston rod 42 by drawing from a liquid reserve supply (not shown), thereby increasing the traction and a release valve (not shown) is included to allow the piston rod 42 to be retracted. Construction of the hydraulic pump and its associated valve is conventional and forms no part of the instant invention. The overlying coaxial placement of the fluid cylinder with respect to the standard member 12 is considered novel and important although the details of cylinder, piston and piston rod are conventional.

A pressure gauge 48 is operatively connected to the hydraulic cylinder 40 and indicates to the operator of the unit 10 the exact amount of traction being provided by the device.

A vertically extending fixture arm 50 is adjustably secured on the standard member 12 by clamping brackets 52 having set screws 54 to hold the fixture arm 50 in a particular relation with respect to the standard member 12.

The horizontal traction means 18 includes a first pulley means 56 rotatably secured to the vertical traction arm 28 exteriorly thereof and a second pulley means 58 adjustably secured to the fixture arm 50 by the clamping bracket 60 and set screw 62. A horizontal traction cable 64 may be passed over the first pulley means 56 and under the second pulley means 58 to provide traction in a horizontal plane.

A cable anchor clamping means 66 having a set screw 68 is vertically adjustable on the standard member 12 and has any conventional means 70 for securing either or both of the vertical traction cable 34 and the horizontal traction cable 64.

Telescoping clamping means 72 are supplied, one vertically adjustable on the standard member 12 by means of a clamping bracket 74 and set screw 76 and the other vertically adjustable on the fixture arm 50 by means of a similar clamping bracket 74 and set screw 76. Set screws 78 are provided to allow the telescoping portions to be fixed relative to each other so that the clamping bracket 80 may be secured over a portion of the frame of a hospital bed, operating table, or the like indicated in dotted lines at 82 in FIGURE 3. It is to be understood that any conventional clamping means may be provided to adjustably secure the mobile unit 10 with relation to a fixed support.

Figure 4:
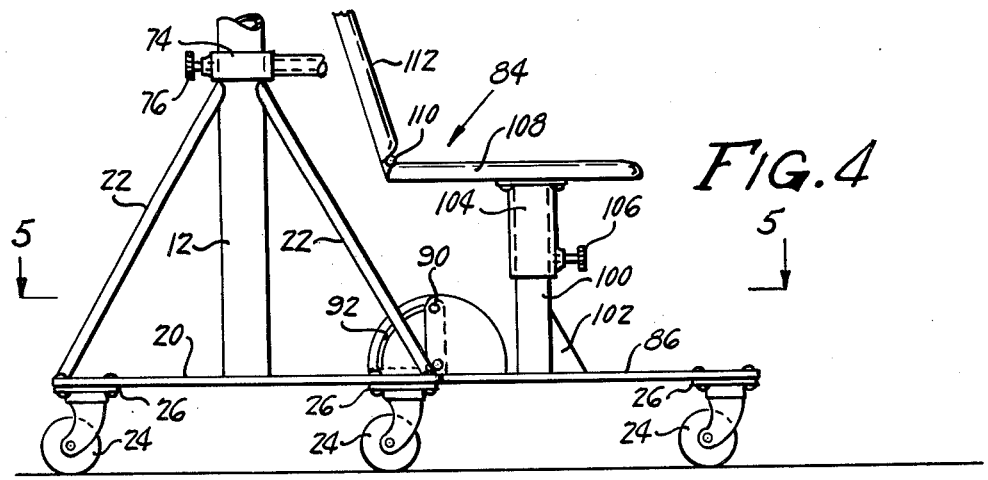
FIGURE 4 is a front elevational view of a modified form of mobile traction unit in accordance wtih the instant invention having a collapsible chair means removably secured thereto, with part broken away for illustrative convenience.
Figure 5:
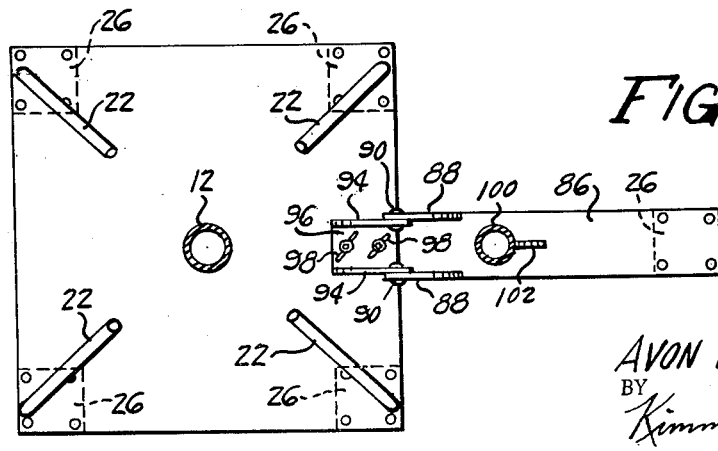
FIGURE 5 is a transverse cross-sectional view taken on line 5—5 of FIGURE 4.

In FIGURES 4 and 5, a modified embodiment of the mobile traction unit 10 of the instant invention is shown having a collapsible chair means indicated generally at 84 pivotally and removably secured to the base member 20 of the transporting means 14. The chair means 84 has a chair base member 86 including at least one caster wheel, such as 24, fixed to a plate member 26 secured to its undersurface similar to the caster wheels 24 and plate members 26 on the base member 20. The chair base member 86 has a pair of arcuate hinge plates 88 each carrying a pin 90 slidably supported in an arcuate slot 92 formed in two upwardly extending members 94 fixed to a hinge plate 96. The hinge plate 96 is removaly secured to the base member 86 by any conventional means, such as the wing nuts 98 shown in FIGURE 5.

A chair supporting post 100 is secured to the chair base member 86 and may be provided with suitable brace members 102. Telescopingly received over the chair supporting post 100 is cylindrical member 104 carrying the set screw 106 or the like to allow for vertical adjustment of the chair means 84. The cylindrical member 104 carries a seat member 108 to which is collapsibly secured by pivot means or the like 110 a back member 112.

The use and operation of the device of the instant invention will now be apparent. The mobile unit 10 can be transported on its caster wheels 24 into juxtaposition with the means carrying the patient to be treated. The clamping means 72 can then be fixed thereto in the manner of FIGURE 3 and the set screws 78 tightened to secure the unit 10 and render it immobile. Depending upon the specific treatment to be given, either vertical or horizontal traction may be applied by securing the respective traction cables 34 or 64 to the patient at one end and fixing the other end to the cable anchor clamping means 66 as at 70 in FIGURE 1. For example, if traction is to be applied to the cervical spine, the patient may be either in a horizontal or upright position. Either vertical or horizontal traction may also be necessary for use with other areas of the body, such as the lower spine or the pelvic. For reduction of fractures, traction in a horizontal plane is almost always necessary. By vertically adjusting the second pulley means 58 on the fixture arm 50, the specific horizontal plane desired can be achieved. Extension of the piston rod 42 by the hand operated hydraulic pump 46 will readily vary the amount of traction applied in either the vertical or horizontal plane and the pressure gauge 48 quickly and accurately indicates the intensity thereof.

The chair means 84 may be readily attached to the basic unit 10 and traction may be easily applied to a patient supported thereby.

It can now be seen that a mobile traction unit is herein provided which satisfies all of the objectives set forth, and others, including many advantages of great practical utility and commercial importance.

By means of the device of the instant invention vertical or horizontal traction can be quickly and accurately provided in several planes and of varying intensity by a portable unit. This device is particularly useful in small insitutations where the multiple use of a single unit is much more desirable.

While the description has been limited to use with human patients, it is to be understood that such a device would be very advantageous for veterinary use, particularly with respect to the treatment of large animals.

Since many embodiments may be made of this inventive concept and since many modifications may be made in the embodiments hereinbefore shown and described, it is to be understood that all matter herein is to be interpreted merely as illustrative, and not in a limiting sense.

I claim:

1. A mobile traction unit comprising a vertically extending standard member having a lower portion and a co-axially extending upper portion,
    (1) a flat base member fixed to said lower portion of said standard member, and at least three spaced apart caster wheels fixed on the underside of said base member,
    (2) said upper portion of said standard member including a full length fluid cylinder unit having therein a piston rotatable within said cylinder, an axially upwardly extending piston rod connected to said piston and having an upper end which extends vertically beyond said fluid cylinder in all positions of said piston,
    (3) fluid supply and exhaust means connected to said fluid cylinder and located adjacent thereto to selectively control the raising and lowering of said piston and piston rod,
    (4) pressure indicating means independently operatively connected to the inside of said fluid cylinder and also located adjacent said fluid cylinder,
    (5) a horizontal arm fixed at one end to said upper end of said piston rod so as to partake of its vertical movements and so as to rotate in a horizontal plane,
    (6) a clamping means adjustably secured for vertical movement around the lower portion of said standard and near said fluid cylinder, said clamping means so designed as to selectively secure either a single traction cable or a plurality of traction cables thereon,
    (7) a horizontal axis axle means fixed transversely in said end of said horizontal arm which is fixed to said upper end of said piston rod, said axle including a portion extending beyond said horizontal arm and journalling a first pulley means capable of passing thereover portions of a single traction cable such as one which could be secured to said clamping means,
    (8) another pulley means also journalled on said horizontal axis axle means at a spaced distance from said first pulley and capable of passing thereover portions of another traction cable such as one of the plurality of traction cables which could be secured to said clamping means,
    (9) whereby a plurality of such traction cables with tractive connections below the top of the unit may be simultaneously shortened by one action of said single fluid cylinder and the total pull thereon may be instantly determined.

2. The traction unit in accordance with claim 1 and additionally,
    (1) a further horizontal axis axle means fixed transversely in the remaining end of said horizontal arm and journalling a further pulley means, said further pulley means aligned with the second-mentioned pulley in the said horizontal arm, and capable of passing thereover horizontal portions of a traction cable and changing the path of said cable to a vertical direction to thus accommodate vertical traction forces,
    (2) and a vertically adjustable horizontal axis pulley means below all of the previously recited pulley means, capable of receiving downwardly extending portions of a first single traction cable from said first recited pulley means and changing the path of said single traction cable to horizontal to thus accommodate horizontal traction forces,
    (3) whereby raising and lowering of said piston and piston rod by a single unit of distance will shorten and extend respectively the end points of application of tractive forces along the line of action of a vertical traction cable and a horizontal traction cable by a double unit of distance, (4) and whereby raising and lowering the height of said vertically adjustable horizontal axis pulley means by a single unit of distance will extend and shorten respectively the end point of application of horizontal tractive forces along the horizontal line of action of a horizontal traction cable by an equal unit of distance, (5) and whereby selective changing of the point of security of each of the usable cables by said clamping means by a single unit of distance will independently change the end point of application of its tractive force along its own line of action by an equal unit of distance.

3. The traction unit in accordance with claim 2 wherein additionally, (1) said vertically adjustable horizontal axis pulley means is also adjustable in horizontal planes passing through its axis by being affixed to a set screw containing clamp bracket, (2) the said bracket encircling a vertically extending fixture arm, the latter arm being adjustably secured at its ends to said upper and lower portion of said standard member, (3) said fixture arm also adjustably carying a first telescopic clamping means with end members suitable for securing said traction unit to a fixed support such as a structural unit of a bed or operating table, (4) and a second telescopic clamping means of similar structure as the first, and secured therebelow to the lower portion of said standard member for attachment to the same or another fixed support.

4. The structure of claim 1 and additionally, (1) a flat chair base member coplanar with said flat base member and pivotally and removably attached to the middle of one side of said flat base member, and additionally supported by a further caster wheel secured below an edge opposite to said pivotal attachment, (2) a vertically adjustable upstanding chair supporting means including a first part secured to the chair base member, a second part in swivel relationship with respect to said first part, (3) a chair seat member substantially centrally attached to said second part of the chair supporting means, (4) and a collapsible chair back member pivotally secured to said chair seat member, (5) whereby determinable traction may be applied to a patient seated in the chair and aligned with one or more traction cables.

References Cited in the file of this patent

UNITED STATES PATENTS

| | | |
|---|---|---|
| 1,296,128 | Siebrandt | Mar. 4, 1919 |
| 1,821,435 | Hamlin | Sept. 1, 1931 |
| 2,186,036 | Peachey | Jan. 9, 1940 |
| 2,631,582 | Bensfield | Mar. 17, 1953 |
| 2,633,124 | Yellin | Mar. 31, 1953 |
| 2,718,886 | Sutton | Sept. 27, 1955 |
| 2,773,499 | ZurNieden | Dec. 11, 1956 |
| 2,837,085 | Tong | June 3, 1958 |
| 2,869,614 | Wamsley | Jan. 20, 1959 |
| 2,940,441 | Demarest et al. | June 14, 1960 |

FOREIGN PATENTS

| | | |
|---|---|---|
| 858,857 | Great Britain | Jan. 18, 1961 |